United States Patent [19]

Ferguson

[11] Patent Number: 4,614,014
[45] Date of Patent: Sep. 30, 1986

[54] METHOD OF MANUFACTURING A VALVE SLEEVE

[75] Inventor: Donald E. Ferguson, Mentor, Ohio

[73] Assignee: Buckeye International, Inc., Columbus, Ohio

[21] Appl. No.: 659,786

[22] Filed: Oct. 11, 1984

[51] Int. Cl.$^4$ .............................................. B21D 53/00
[52] U.S. Cl. .................... 29/157.1 R; 29/557; 29/DIG. 26; 29/DIG. 33; 29/DIG. 41; 72/325; 72/340; 72/356; 72/370; 251/367
[58] Field of Search .................. 29/157.1 R, 557, 558, 29/DIG. 26, DIG. 33, DIG. 41; 72/324, 325, 340, 356, 370; 251/366, 367, 359

[56] References Cited

U.S. PATENT DOCUMENTS

| | | | |
|---|---|---|---|
| 1,714,398 | 5/1929 | O'Bannon | 29/157.1 R X |
| 1,829,022 | 10/1931 | Stevenson | 29/157.1 R |
| 1,870,970 | 8/1932 | Stevenson | 29/157.1 R |
| 3,591,139 | 7/1971 | Bishop | 251/367 |
| 4,103,407 | 8/1978 | Elizalde et al. | 29/157.1 R |
| 4,292,831 | 10/1981 | Simon | 72/370 X |
| 4,419,877 | 12/1983 | Alfano | 72/325 |
| 4,450,704 | 5/1984 | Schaeffler et al. | 72/356 |
| 4,535,519 | 8/1985 | Kajikawa et al. | 29/157.1 R |

OTHER PUBLICATIONS

"Swage" and Swaging, *Dictionary of Mechanical Engineering*; Nayler et al.; George Newnes Ltd., London, 1967, pp. 352-353.

*Primary Examiner*—Howard N. Goldberg
*Assistant Examiner*—R. S. Wallace
*Attorney, Agent, or Firm*—Fay, Sharpe, Fagan, Minnich & McKee

[57] ABSTRACT

A method of manufacturing a cylindrical valve sleeve is provided. The method includes the steps of providing a cylindrical valve having an inner wall, an outer wall and an end shoulder disposed therebetween. The shoulder is machined to form a circumferential groove which defines a swedgeable shoulder area on the shoulder. The inner wall is broached to include a plurality of open ended longitudinal slots radially spaced about the inner wall. Next, the shoulder areas are swedged at preselected spaced positions contiguous to the end portions of the longitudinal slots to deform the preselected positions axially and radially inwardly into the slot end portions whereby the slot end portions are substantially closed relative to the inner wall of the sleeve. The preselected spaced positions are discontinuous relative to the shoulder to minimize the necessary force and resulting deformation.

4 Claims, 11 Drawing Figures

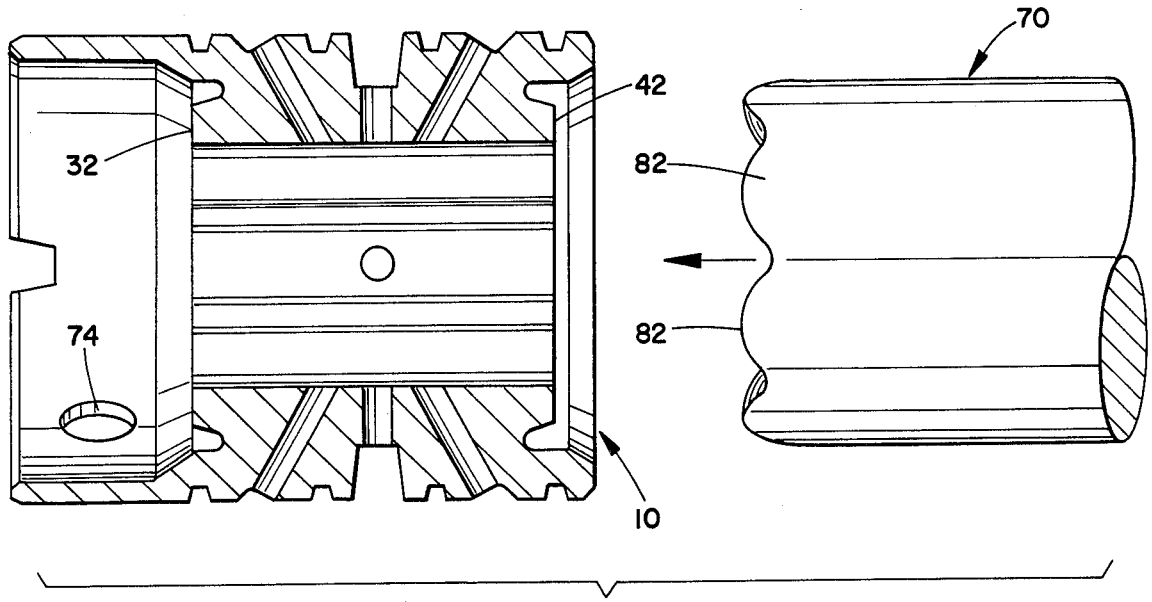
FIG. 9
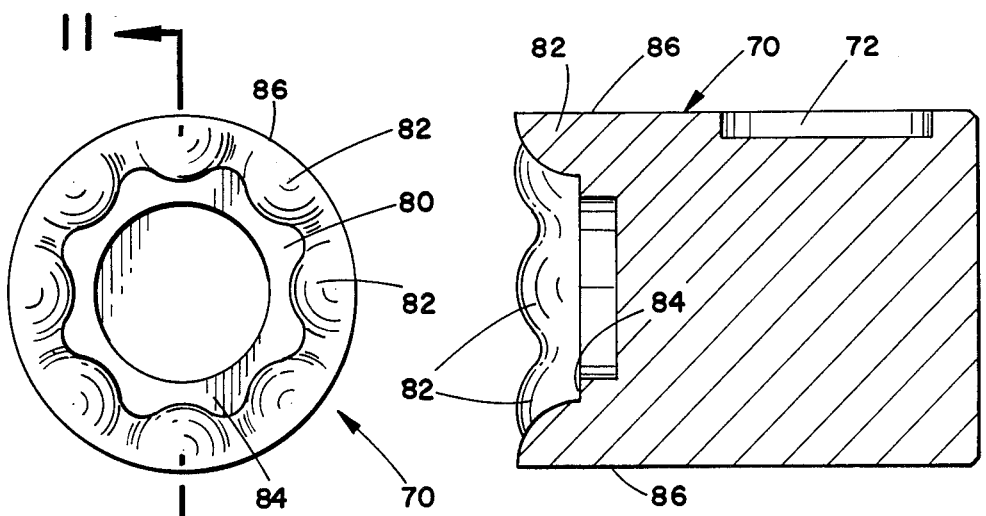
FIG. 10
FIG. 11

METHOD OF MANUFACTURING A VALVE SLEEVE

BACKGROUND OF THE INVENTION

The invention pertains to the art of manufacture of cylindrical sleeves and more particularly to cylindrical sleeves having grooves or slots.

The invention is particularly applicable to the manufacture of a rotary valve sleeve employed in an automotive power steering gear assembly wherein a plurality of spaced grooves on the inner cylindrical walls of the valve sleeve need be closed at their terminal ends to contain and control fluid flow for the steering assembly. However, it will be appreciated to those skilled in the art that the invention could be readily adapted for use in other environments as, for example, where grooves spaced in an item wall need be closed at their terminal ends with a minimum of applied force and resulting distortion to the item.

Rotary valve sleeves are common components of power assist assemblies and are particularly common in automotive power steering assemblies to control the flow of fluid in accordance with the desired operation of the gear and valve. The rotary valve sleeve is typically of a generally cylindrical configuration including a plurality of circumferential grooves along the outer wall of the sleeve, and a plurality of spaced axial grooves along the inner sleeve wall for the conduct and communication of fluid through various flow paths. Radial bore holes communicate several of the outer wall grooves with several associated inner wall grooves. A typical rotary valve sleeve and prior art method of manufacturing same is shown in U.S. Pat. No. 4,419,877.

A feature of the manufacture of such valve sleeves involves substantially closing the terminal end portions of the inner wall grooves relative to the inner wall to contain fluid within the groove between the sleeve and the shaft received within the sleeve. Various methods of manufacture have been suggested to effect closing of the grooves. It has been found that the defects present in such methods are such that the methods themselves and the resulting work pieces have limited economic and practical value.

One particularly common method of manufacture of a rotary valve sleeve includes positioning an annular ring in the sleeve adjacent the terminal end portions of the inner wall grooves. The ring has an inner diameter substantially equal to the inner wall so that the grooves are substantially closed off. The ring may be fixed to this position in any of a variety of known ways.

The particular disadvantage of this method is cost. The cost to supply two additional annular ring components requiring close tolerance specifications has been particularly undesirable.

In addition, there are the obvious problems associated with the assembly and maintenance of a multi-component device.

An alternative method of manufacture includes orbital forming of an annular bead at a shoulder on the sleeve adjacent the groove terminal end portions. Orbital forming comprises moving or rolling a tool around the shoulder part under a lot of pressure in an orbital fashion. The rolling single point contact would deform the shoulder as the tool moved to form an annular bead disposed toward the sleeve inner wall. This method of manufacture failed for the particular problem of producing work parts that would crack and break and which were accordingly totally unsafe. It was suggested to first heat the part before the orbital forming operation which did provide some improvement, but even so, the problems of sleeve cracking and breaking remained.

It is also known to close the terminal end portions of the inner grooves with straight crushing or swedging by abutting a punch against the complete circumference of the inner wall shoulders adjacent the groove terminal ends to deform the shoulders and produce a bead for closing the groove end. Such punches have comprised annularly configured devices to produce a continuous annular bead about the shoulder. Usually the method involves simultaneous straight abutment against opposite shoulders at the opposite ends of the inner grooves for simultaneous deformation and production of the continuous annular bead at each end of the internal grooves.

It has been found that the defects present in such a method of manufacture of a rotary valve sleeve are such that the method and resulting work pieces have limited economic and practical value.

However, the necessity for maintaining close size and configuration specifications of the rotary valve work piece during manufacture has increased over time in accordance with increased demand for quality control. The component work pieces themselves as well as their assembly in the straight swedging technique have been unable to perform in accordance with demand. Such demand now dictates that the size and configuration specifications of an item such as a rotary valve sleeve be maintained within thousandths of an inch during manufacture to be acceptable in the marketplace. Such close tolerances have placed a burden upon manufacturers to improve methods of manufacture to maintain such standards.

The straight swedging method of manufacturing a rotary valve sleeve has been unable to maintain the desired tolerances due to the resulting distortion to the work pieces.

More particularly, the forces necessary to punch an annular bead on a conventional rotary valve sleeve for closing inner wall grooves at their terminal ends are in the nature of 20 tons. When such a force is applied to a typical work piece which is less than two inches long and an inch and one half in diameter, it is obvious that distortion will occur to not only the overall length of the sleeve, but to numerous other parts and sections of the sleeve such as circumferential grooves along the outer wall and the compression of radial bores extending through the sleeve side wall.

Another problem with conventional methods is the consumption of large amounts of energy. For example, the expense to apply a force in the order of 20 tons adds to the cost of the manufacture of the valve sleeve itself. Also, such large forces are expected to present dangers and risks to workers involved in the manufacture and exposed to the operation and application of the necessary punching equipment.

The present invention contemplates a new and improved method of manufacture of a valve sleeve which overcomes all of the above referenced problems and others to provide a new method of manufacture which is simple in design, economically more efficient in manufacture, readily adaptable to a plurality of valve sleeves having a variety of dimensional characteristics, easy to operate and which provides improved sleeve work pieces having improved size and configuration specifications and tolerances.

BRIEF SUMMARY OF THE INVENTION

In accordance with the present invention, there is provided a method of manufacturing a rotary valve sleeve for a power assisted automobile steering gear comprising the steps of:

(a) providing a cylindrical valve sleeve having an inner wall, an outer wall, an end shoulder disposed therebetween, and a plurality of longitudinal or axial slots or grooves radially spaced about the inner wall;

(b) swedging the end shoulder contiguous to the slots to provide slot end displacements generally radially extending to the inner wall to close the slots; and, (c) boring the sleeve to remove excessive portions of the slot end displacements to set the inner wall to a preselected inner diameter.

The swedging comprises displacing a discontinuous circumferential portion of the end shoulder adjacent the slots.

In accorance with another aspect of the present invention, the slot end displacements comprise a plurality of spaced, radially-inwardly directed protrusions. The slot end displacements comprise terminal end portions of the slots preferably having an axial dimension of at least 0.065 inches.

In accordance with a further aspect of the present invention, the valve sleeve includes a pair of end shoulders contiguous to terminal ends of the longitudinal slots, and the swedging comprises simultaneously displacing discontinuous circumferential portions adjacent the terminal ends of the pair to generally close the terminal ends.

In accordance with the present invention, a tool for swedging shoulder flanges of a rotary valve sleeve to close fluid communicating slots at slot terminal ends is provided. The tool comprises a tool face including a plurality of protruding members circumferentially spaced about an annular portion of the face. The members have a generally quarter sphere configuration arcuately depending from a central portion of the face toward a radially outermost end wall of the tool.

One benefit obtained by use of the present invention is a method of manufacturing a valve sleeve which swedges shoulder flanges contiguous to sleeve inner wall axial grooves discontinuously but contiguous to the groove end portions to substantially close the grooves at their terminal ends with a minimum of distortion to the other parts of the sleeve.

Another benefit obtained from the present invention is a method for manufacturing a valve sleeve which provides a sleeve having improved tolerances to size and configuration.

A further benefit of the present invention is a method of manufacture which reduces the energy costs to manufacture the valve sleeve and accordingly reduces the cost of the finished work piece.

Yet another benefit obtained by the method of the present invention is a sleeve that is not prone to cracking or breaking.

Other benefits and advantages for the subject new method will become apparent to those skilled in the art upon a reading and understanding of this specification.

BRIEF DESCRIPTION OF THE DRAWINGS

The invention may take physical form in certain parts and arrangements of parts, and in cerain steps and arrangements of steps, the preferred embodiments of which will be described in detail in the specification and illustrated in the accompanying drawings which form a part hereof and wherein:

FIG. 9 is a cross-sectional view of the sleeve identical to that of FIG. 4 in combination with a partial elevational view of the swedging tool indicating alignment of the tool to the sleeve prior to swedging;

FIG. 10 is an elevated end view of the swedging tool; and,

FIG. 11 is a cross-sectional view of the swedging tool take along lines 11—11 of FIG. 10.

DETAILED DESCRIPTION OF THE INVENTION

Figure 1:
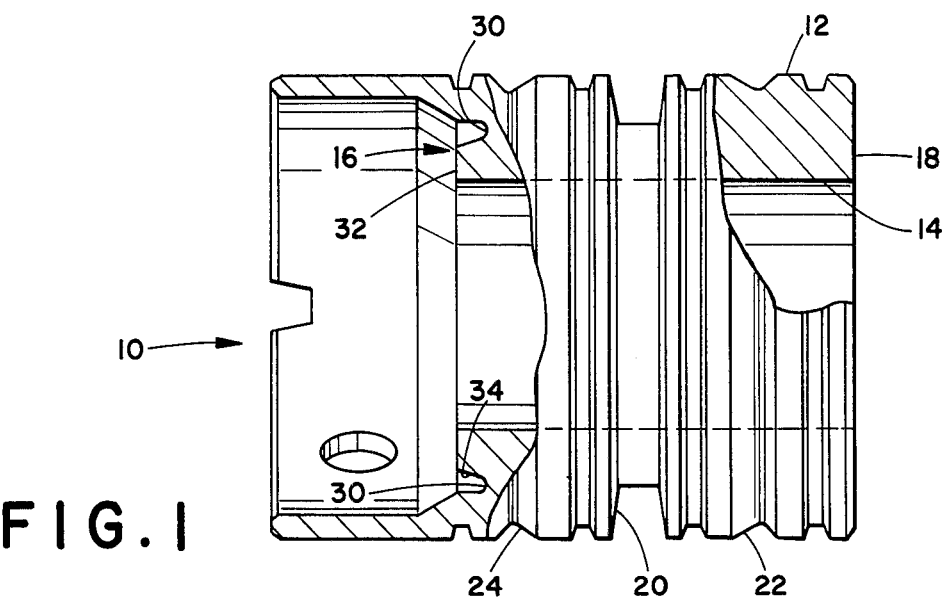
FIG. 1 is an elevated view in partial section of a valve sleeve after an initial manufacturing step in which the sleeve has been machined on one end portion to form a circumferential groove defining a swedgeable end shoulder.

Referring now to the drawings wherein the showings are for purposes of illustrating the preferred embodiment of the invention only, and not for purposes of limiting same, the Figures show a cylindrical valve sleeve 10 particularly useful as a rotary valve sleeve in an automotive power steering gear assembly. The sleeve 10 includes an outer wall 12, an inner wall 14, a first end shoulder 16 and a second end shoulder 18 disposed radially between the inner and outer walls. The sleeve 10 includes a plurality of circumferential slots or grooves 20, 22, 24 disposed about the outer wall 12 of the sleeve. These grooves serve to operate as fluid flow paths for the steering assembly.

The method of the subject invention is broadly categorized into three general areas or steps. The first step involves premachining the sleeve 10 to prepare for the swedging operation; the second comprises aligning a properly designed swedge tool; and, the third comprises swedging with the proper amount of force to effect a proper deformation without other distortion to the sleeve 10.

In preparing the sleeve 10 prior to swedging, the first step of the subject invention comprises machining the first end shoulder 16 of the sleeve to provide a circumferential groove 30 defining a swedgeable shoulder area 32. Groove 30 is cut such that the groove is spaced radially outwardly from the inner wall 14 such that area 32 may receive the swedging tool for deformation of the area 32. Groove 30 has a radially innermost side wall 34 inclined 15° relative to the sleeve centerline. Such a groove configuration facilitates swedgeable shoulder area 32 deformation radially inwardly and axially without distortion to the other portions of the sleeve 10, as will hereinafter be more fully explained.

Figure 2:
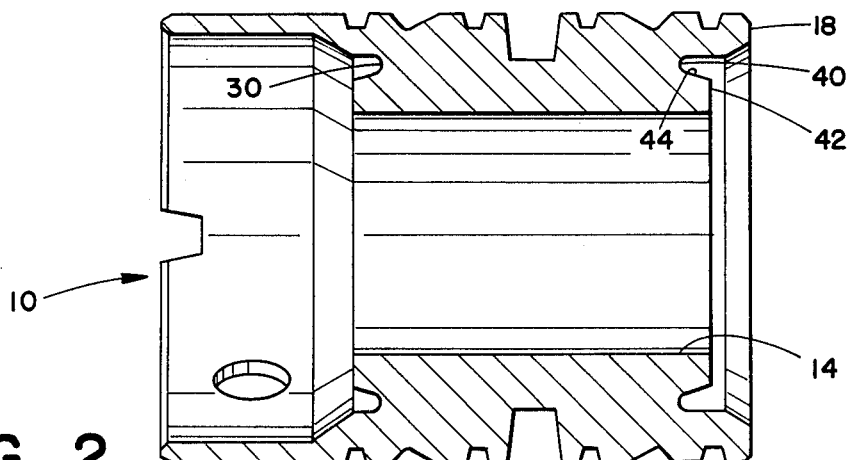
FIG. 2 is a cross-sectional view of the same work piece after it has been so machined on two end portions.

With reference to FIG. 2, the second step of the subject invention comprises machining a circumferential groove 40 in the second end shoulder 18 similar to the first groove 30. Second groove 40 defines a second swedgeable shoulder area 42 extending from the groove inner wall 44 to the inner wall 14. The machining of both first groove 30 and second groove 40 is accomplished with conventional counterbore, countersink and face machining techniques.

Figure 3:
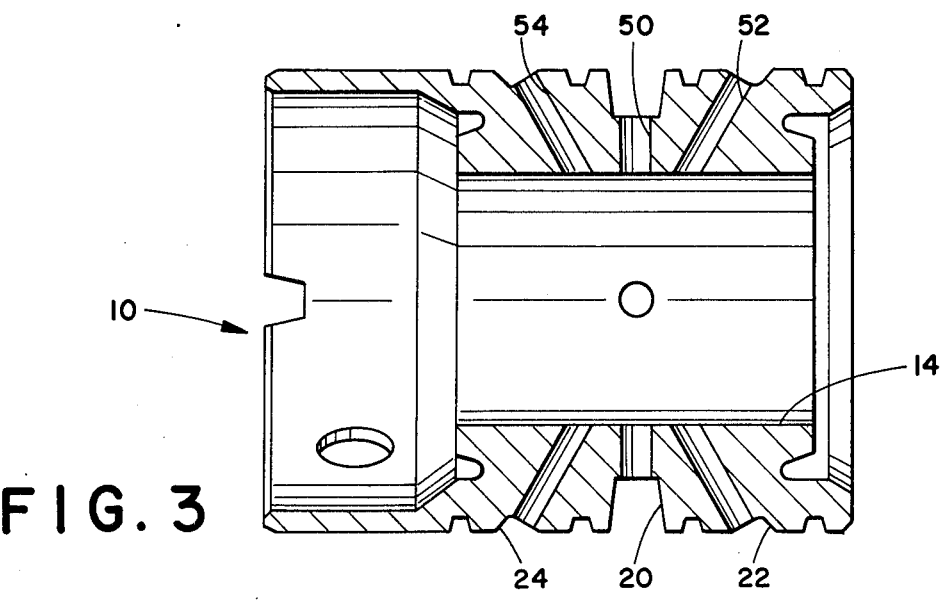
FIG. 3 is a cross-sectional view of the workpiece of FIGS. 1 and 2 after the manufacturing step of drilling generally radially directed bores.

With reference to FIG. 3, the next step in the manufacture of the valve sleeve 10 includes drilling a plurality of generally radially directed bore holes 50, 52, 54 extending from the outer wall circumferential grooves 20, 22, 24 to the sleeve inner wall 14. The bore holes eventually serve to communicate fluid from the circumferential grooves to an input shaft (not shown) received in the sleeve 10.

Figure 4:
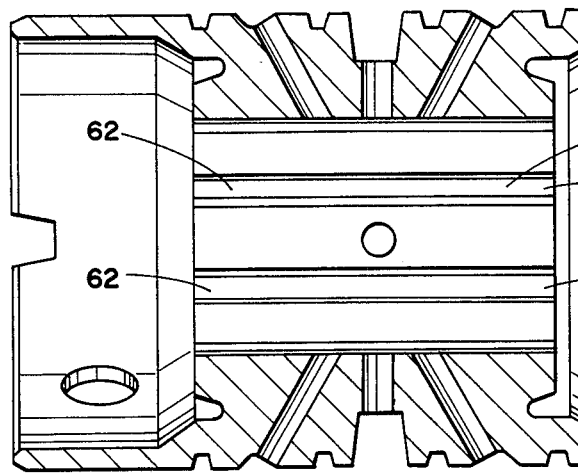
FIG. 4 is a cross-sectional view of the same work piece after the step of broaching or cutting a plurality of spaced longitudinal or axial grooves along the inner side wall of the sleeve.
Figure 5:
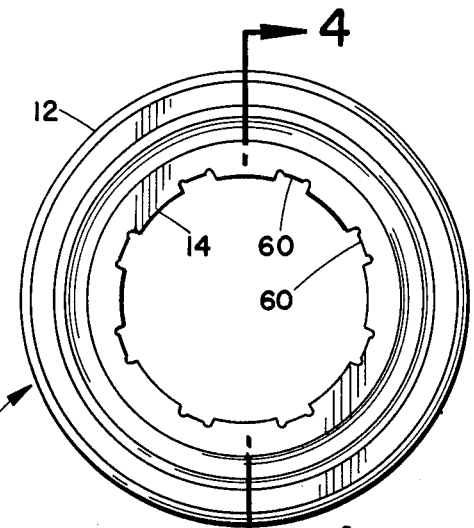
FIG. 5 is an end view of the work piece after the manufacturing step illustrated in FIG. 4.

With reference to FIGS. 4 and 5, the next step of the method of the subject invention involves broaching a plurality of longitudinal or axial grooves or slots 60 axially along the inner wall 14 of the sleeve 10. The broaching step accomplishes not only the provision of the longitudinal slots 60, but also removes any burrs left as a result of the bore hole drilling. The slots 60 are open ended and include first and second slot end portions 62, 64 contiguous to the swedgeable shoulder areas 32, 42.

All of the above steps involve preparation of the sleeve part 10 prior to swedging.

The method of the present invention involves swedging only selected portions of the shoulder areas 32, 42 to provide the advantageous operational features of relatively low energy and force and virtually no distortion to other areas of the part. It is important, therefore, that the swedge tool be particularly aligned with the sleeve 10 so that only the minimal necessary deformation to the shoulder areas need be accomplished to effect the desired result of closing the longitudinal slot end portions 62, 64. With reference to FIGS. 9, 10 and 11, the swedging die 70 includes a locating key 72 (FIG. 11) and sleeve 10 similarly includes a locating key 74 which are selectively positioned in a swedging press to properly align the sleeve 10 relative to the die 70.

The swedging die 70 is pressed into the shoulder areas 32, 42 to deform the shoulder areas at preselected spaced positions contiguous to the end portions 62, 64 of the longitudinal slots to deform the positions axially and radially inwardly into the slot end portions whereby the slot end portions are substantially closed relative to the inner wall 14. It should be particularly noted that this step comprises displacing a discontinuous circumferential portion of the end shoulder adjacent the slots as opposed to a continuous annular deformation.

Figure 6:
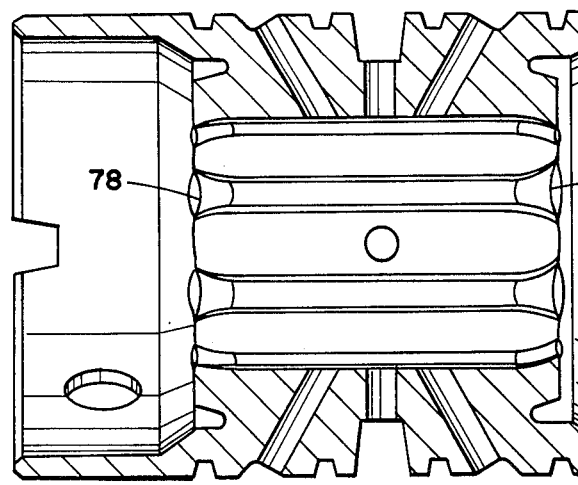
FIG. 6 is a cross-sectional view of the work piece after the swedgeable shoulders have been swedged adjacent the slot terminal end portions.
Figure 7:
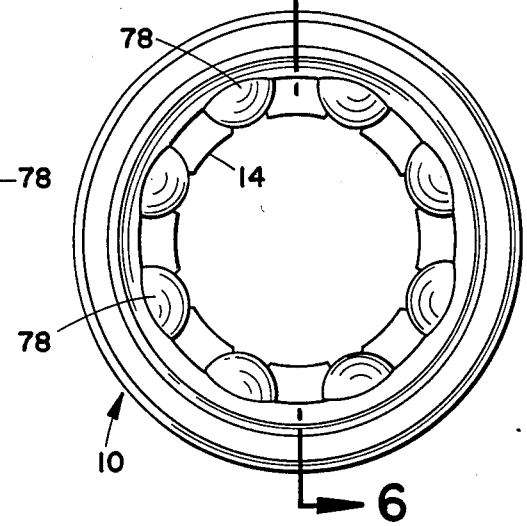
FIG. 7 is an end view of the work piece illustrated in FIG. 6.

With reference to FIGS. 6 and 7 the sleeve 10 is illustrated after the swedging operation. It may be seen that a plurality of deformations 78 are provided in alignment with these slot end portions to substantially close off the end portions relative to the inner wall 14. It is an operational advantage that the amount of force necessary to produce the desired deformation 78 is substantially less than the prior art techniques employed to close off the longitudinal slots. It has been found that a force in the area of 10 to 11 tons is adequate to effect the proper deformation, while prior art techniques which produced a continuous annular deformation required as much as 21 tons. In addition, the force of the present invention provides substantially no distortion in the other parts of the sleeve 10. For example, the prior technique of employing a continuous annular deformation would cause distortion in the overall length of the sleeve 10, in the configuration of the circumferential grooves 20, 22, 24 and in the roundness of the bore holes 50, 52, 54. In addition, it has been found that the present invention virtually eliminates cracking and breaking on the swedgeable shoulder areas as was common place in the prior art orbital forming techniques.

Although it is a feature of the invention that only a particular amount of material in the shoulder areas 32, 42 is deformed to close off the longitudinal slots 60, it is easily foreseeable that occasionally more metal may be moved axially inward than desirable.

Figure 8:
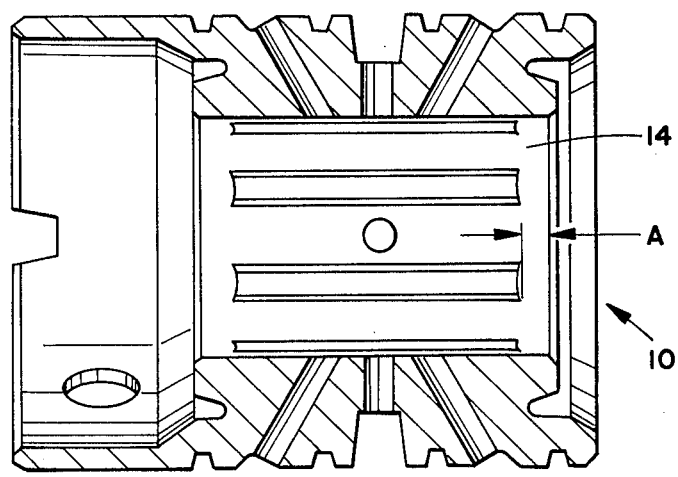
FIG. 8 is a cross-sectional view of the work piece after the inner diameter has been bored.

With reference to FIG. 8, the last step of the present invention involves boring the inner diameter 14 of the sleeve out to set a precise diameter for the inner wall 14. It has been found that for a rotary valve sleeve manufactured in accordance with the present invention having an inner wall diameter of approximately 0.8 inches, that the axial extent of the closed slot end portion should approximate 0.065 inches to effectively maintain a fluid seal against an input shaft received in the sleeve 10. (Note dimension A shown on FIG. 8.)

The sleeve 10 is finished with conventional induction hardening, deep freezing, drawing and grinding techniques.

With reference to FIGS. 10 and 11, the swedging tool 70 includes a work face 80 having a radially outermost portion including a plurality of protruding members 82 circumferentially spaced about an annular portion of the face 80. The protruding members 80 have a generally quarter-sphere configuration arcuately depending from a central portion of the face 84 toward the radially outermost end wall 86.

The invention has been described with reference to the preferred embodiment and method. Obviously, modifications and alterations will occur to others upon the reading and understanding of the specification. It is my intention to include all such modifications and alterations insofar as they come within the scope of the appended claims or the equivalents thereof.

Having thus described my invention, I now claim:

1. A method of manufacture of a cylindrical valve sleeve including the steps of:
   (a) providing a cylindrical valve having an inner wall, an outer wall and an end shoulder therebetween;
   (b) machining said shoulder to provide a circumferential groove disposed radially outwardly from the inner wall to define a swedgable shoulder area sized for axial and radial deformation to form a radially-inwardly displaced protrusion;
   (c) broaching said inner wall to provide a plurality of open-ended longitudinal slots radially spaced about said inner wall; and,
   (d) swedging said shoulder area at preselected spaced positions contiguous to end portions of said longitudinal slots to deform said positions axially and radially-inwardly into said slot end portions to form a plurality of spaced and discontinuous protrusions in association with said slots whereby said slot end portions are substantially closed.

2. The method as claimed in claim 1 wherein the step of machining said shoulder comprises cutting a groove spaced radially-outwardly from said inner wall, said groove having a radially-innermost side wall inclined 15° relative to a sleeve center line.

3. The method as claimed in claim 2 further including the step of boring said sleeve inner wall to remove excessive radially-inward deformation of said shoulder areas.

4. The method as claimed in claim 3 wherein said swedging and boring provides a shoulder area deformation into said slot end portions having an axial extent of at least 0.065 inches.

* * * * *